US012780054B2

(12) United States Patent
Stout et al.

(10) Patent No.: US 12,780,054 B2

(45) Date of Patent: Nov. 3, 2026

(54) NESTING SECOND ROW SEAT

(71) Applicant: FCA US LLC, Auburn Hills, MI (US)

(72) Inventors: Mark E Stout, Auburn Hills, MI (US); Travis D Bechtel, Auburn Hills, MI (US); Brandon F Brady, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 195 days.

(21) Appl. No.: 18/912,750

(22) Filed: Oct. 11, 2024

(65) Prior Publication Data

US 2026/0103120 A1 Apr. 16, 2026

(51) Int. Cl.

*B60N 2/02* (2006.01)
*B60N 2/06* (2006.01)
*B60N 2/12* (2006.01)
*B60N 2/14* (2006.01)

(52) U.S. Cl.

CPC .............. *B60N 2/12* (2013.01); *B60N 2/0256* (2023.08); *B60N 2/06* (2013.01); *B60N 2/14* (2013.01)

(58) Field of Classification Search

CPC .... B60N 2/309; B60N 2/3013; B60N 2/3031; B60N 2/3065; B60N 2/14; B60N 2/06; B60N 2/0256

See application file for complete search history.

(56) References Cited

U.S. PATENT DOCUMENTS

| | | | | |
|---|---|---|---|---|
| 4,834,452 A * | 5/1989 | Goodrich | ............. | B60N 2/0856 297/240 |
| 7,281,761 B2 | 10/2007 | Brown et al. | | |
| 11,292,367 B2 | 4/2022 | Aktas et al. | | |
| 2009/0174246 A1 | 7/2009 | Kaip et al. | | |
| 2024/0157859 A1 * | 5/2024 | Panchani | ................ | B60N 2/12 |

FOREIGN PATENT DOCUMENTS

| | | |
|---|---|---|
| CN | 111347946 A | 6/2020 |
| GB | 2417197 A | 2/2006 |

* cited by examiner

*Primary Examiner* — Alfred J Wujciak

(74) *Attorney, Agent, or Firm* — Jeremy J. Klobucar

(57) ABSTRACT

A vehicle seat has a seat swivel to engage rails in a vehicle. The seat swivel is slidable on the rails and enables rotation of the vehicle seat. A seat support is coupled with the seat swivel. A seat back is coupled with the seat support. A reclining mechanism is coupled with both the seat back and seat support for pivoting of the seat back with respect to the seat support. A seat cushion frame is movably coupled with the seat support such that in a first position, the seat cushion frame is in a sitting position, and in a second position, the seat cushion frame is in a non-sitting storage position.

14 Claims, 6 Drawing Sheets

NESTING SECOND ROW SEAT

FIELD

The present disclosure relates to vehicles and, more particularly, to nesting second row seats for multi-person vehicles.

BACKGROUND

This section provides background information related to the present disclosure which is not necessarily prior art.

Multipurpose vehicles (MPVs) are often used to transport combinations of people and cargo. Users expect the interiors of these vehicles to be easily configurable to support the variety of uses. MPVs are commonly built with seating for two or three rows of occupants in a large cargo carrying area. Several methods exist that enable the rear rows of seats to collapse, stow or otherwise move out of the way to enable additional seating configurations or to enable the cargo carrying volume to increase. Stowing the second and/or third row seats in the floor of the vehicle is advantageous due to the ability to maintain a low cargo floor. This type of design creates a packaging conflict for battery operated electric vehicles where the high voltage battery is most commonly packaged in or under the floor of the vehicle. Thus, stowing a seat underneath the floor of this vehicle would result in an unreasonably high cabin floor and step-in height for the passenger.

Another common method of increasing the cargo volume of a two to three row vehicle is to fold the seats flat within the vehicle cabin. While not creating an unnecessary high floor for passenger ingress and egress, this results in a high floor, reducing cargo space for large cargo and any large cargo must sit on top of the backs of the folded seats. Another concept exists where the second row seat collapses in a stadium position, folding the seat cushion upward against the seat back and maintaining the upright position of the seatback. The second row seatback must be offset rearward by at least the thickness of the seat cushion in this case, limiting the amount of total storage space available. One variation on the design seat rotates the second row seat cushion 90° down instead of 90° up. This enables the second row backseat to press directly against the back of the first row seat, but forces the second row seat back to rise upward off the floor to get the cushion rotated all the way down. This increases the second row seat height and creates a risk of visible noticeable shaking and decreases rearward visibility. It also interrupts the ability of the first row seat to recline.

The structure and mechanism of current stow in floor seat designs do not permit swiveling. The stadium style stowing seats do have swivel capability but these have several drawbacks. A primary benefit of stowing seats is the opportunity afforded to reconfigure the cabin of a vehicle for various cargo carrying and socialization uses. Achieving a second row seat that combines swiveling capability with the ability to store in a sympathetic location to the front row seats greatly increases the number of useful configurations for the customer. Thus, it is desirable that a second row seat be able to move out of the second row seating area for large cargo without needing to remove the seat from the vehicle all together, but in a way that maintains as low a floor height for both passengers and cargo as possible.

The present disclosure provides a second row seat that nests in a sympathetic location to the front seat, collapsing in such a way that the cushion of the second row seat stores underneath that of the first row seat.

The present disclosure enables the area occupied by the second row seat to be emptied for reconfiguration of the cabin for occupant socialization for large cargo carrying. The present disclosure enables the second row seat of the multipurpose vehicle, with a battery package in the floor of the vehicle, to stow out of the way to open up cabin space for socialization or cargo carrying. The present disclosure maintains low floor height characteristic of a multipurpose vehicle for passenger and carrying cargo. The present disclosure enables the interior of a battery electric vehicle of the multipurpose type to be reconfigured for additional space without removal of seats. The present disclosure enables a second row seat to stow directly against the back of the front row seat while maintaining a height of the seat back equal to or lower than the design position and preserves the reclining capability of the front seat. The present disclosure enables the second row seat, in the multipurpose vehicle, to stow or swivel 90° to 180°.

SUMMARY

This section provides a general summary of the disclosure, and is not a comprehensive disclosure of its full scope or all of its features.

According to a first aspect of the present disclosure, a vehicle seat comprises a seat swivel to engage rails in a vehicle. The seat swivel is slidable on the rails and enables rotation of the vehicle seat. A seat support is coupled with the seat swivel. The seat back is coupled with the seat support. A reclining mechanism is coupled with both the seat back and the seat support to enable pivoting of the seat back with respect to the seat support. A seat cushion frame is movably coupled with the seat support such that in a first position, the seat cushion frame is in a sitting position and in a second position, the seat cushion is in a non-sitting storage position. The seat support includes at least one linkage pivotably coupled with the seat support and the seat cushion frame. Preferably a pair of linkages. The seat support includes a cradle to secure the seat cushion frame in the first setting position. The seat cushion frame includes a pair of links and a pair of shafts. The links pivot with respect to the shafts and the links and shafts couple with one another forming a rectangular configuration. One of the shafts is coupled with a seat support linkage to move the seat cushion frame to the second position fore of the seat support. The seat cushion frame is positioned under a first row seat.

According to a second aspect of the present disclosure, a vehicle having a first row seat and a second row seat comprises rails in a floor of the vehicle. The second row seat is received in the rails. The second row seat comprises a vehicle seat comprising a seat swivel to engage rails in a vehicle. The seat swivel is slidable on the rails and enables rotation of the vehicle seat. A seat support is coupled with the seat swivel. The seat back is coupled with the seat support. A reclining mechanism is coupled with both the seat back and the seat support to enable pivoting of the seat back with respect to the seat support. A seat cushion frame is movably coupled with the seat support such that in a first position, the seat cushion frame is in a sitting position and in a second position, the seat cushion is in a non-sitting storage position. The seat support includes at least one linkage pivotably coupled with the seat support and the seat cushion frame. Preferably a pair of linkages. The seat support includes a cradle to secure the seat cushion frame in the first setting position. The seat cushion frame includes a pair of links and a pair of shafts. The links pivot with respect to the shafts and the links and shafts couple with one another forming a rectangular configuration. One of the shafts is coupled with a seat support linkage to move the seat cushion frame to the second position fore of the seat support. The seat cushion frame is positioned under a first row seat.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
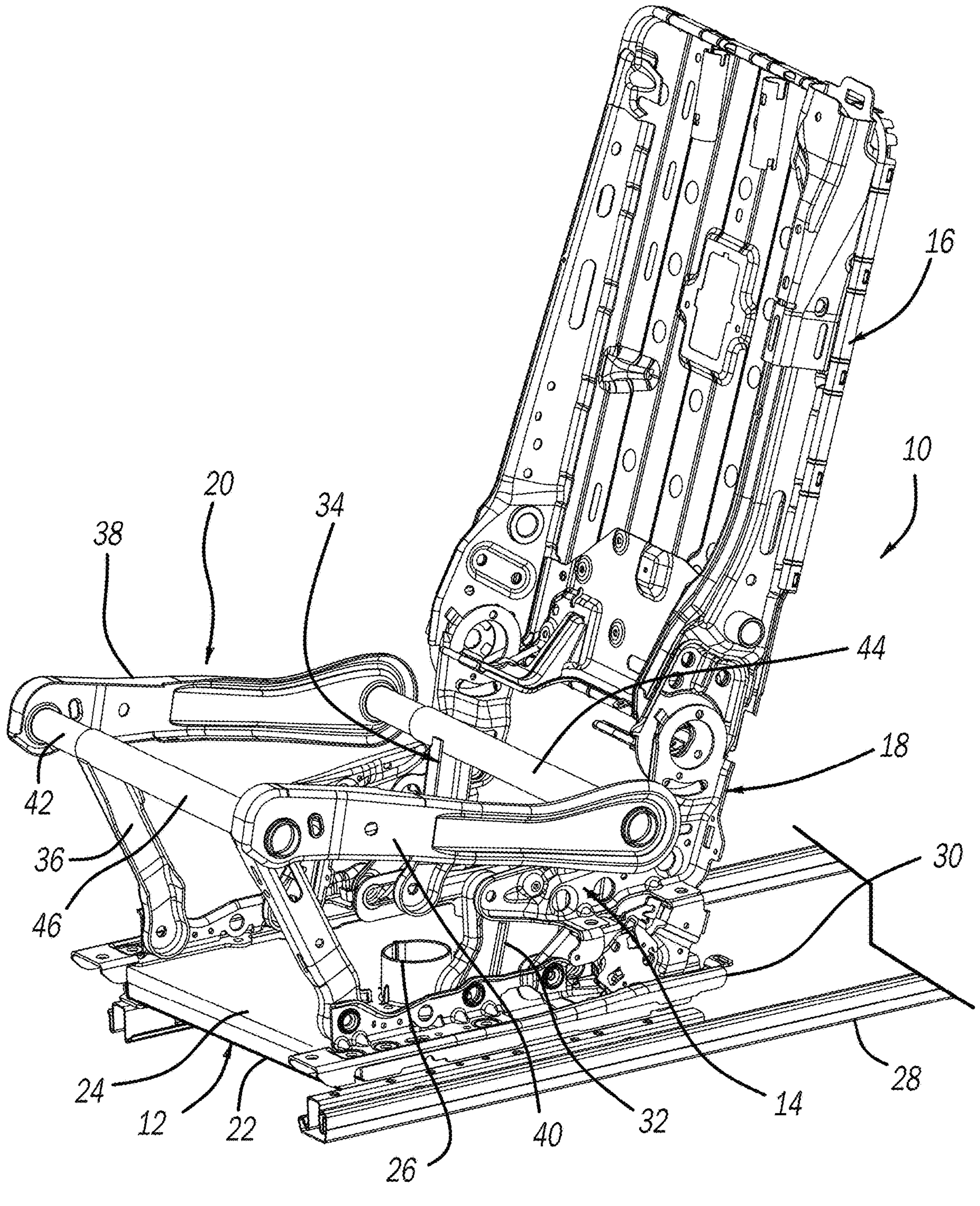
FIG. 1 is a perspective view of a seat framework in accordance with the disclosure.
Figure 2A:
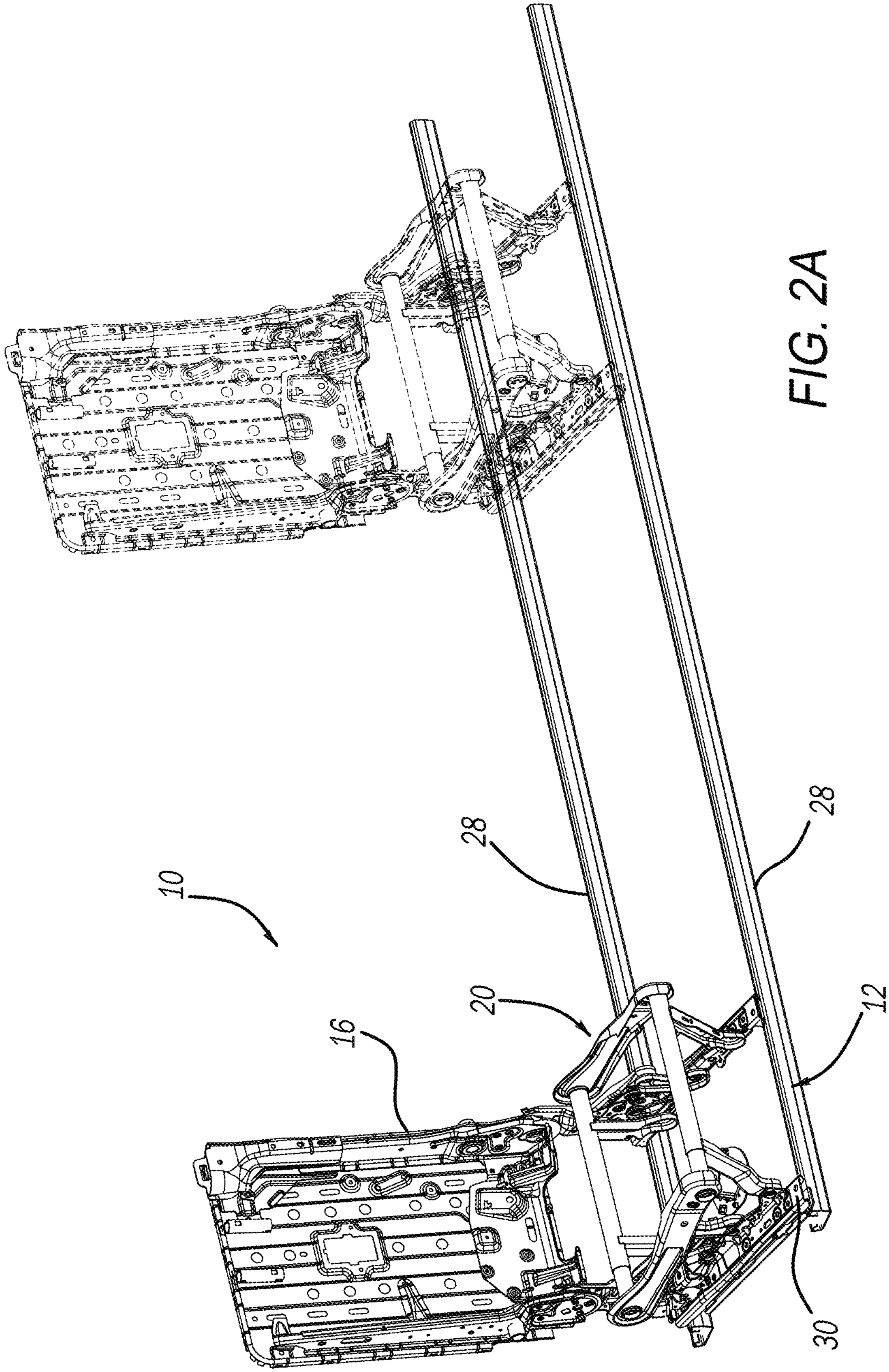
FIG. 2A is a perspective view of the seat in a rotated position.
Figure 2B:
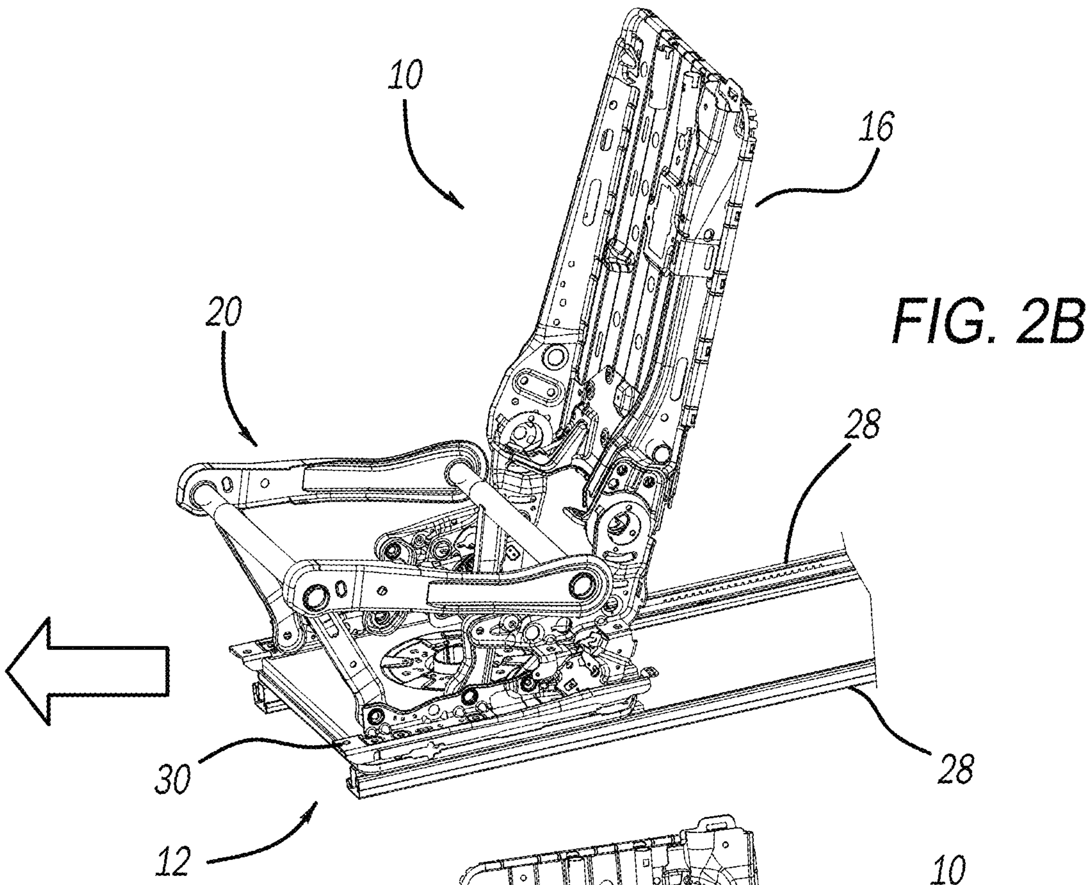
FIG. 2B is a view like FIG. 2A with the seat moving axially on the rails.
Figure 2C:
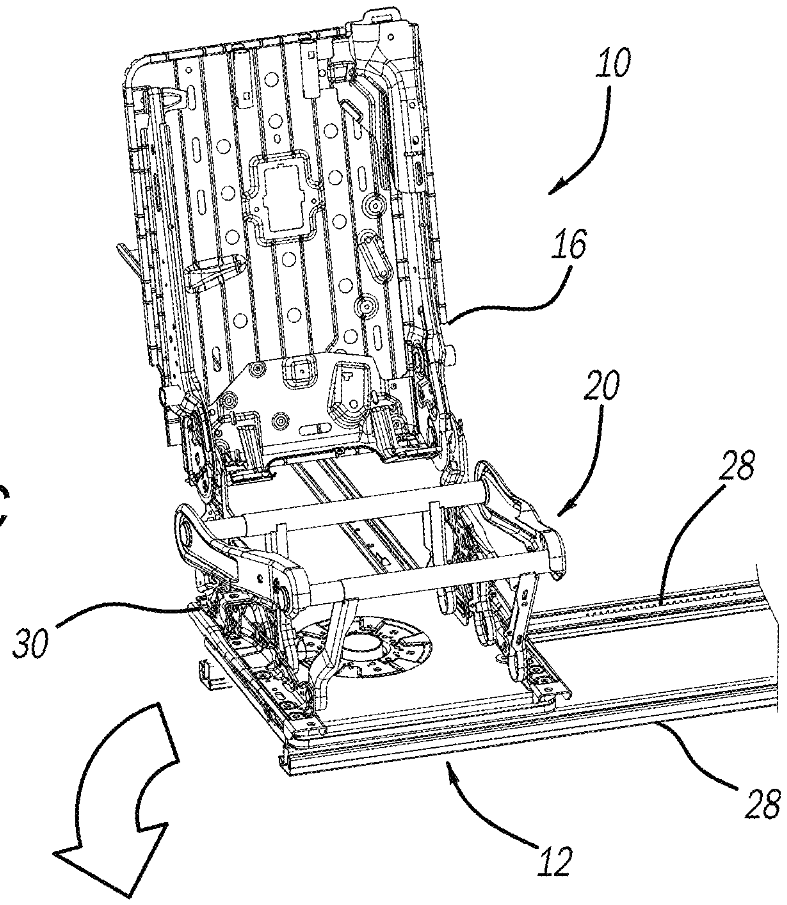
FIG. 2C is a view like FIG. 2A with the seat rotated 90°.
Figure 2D:
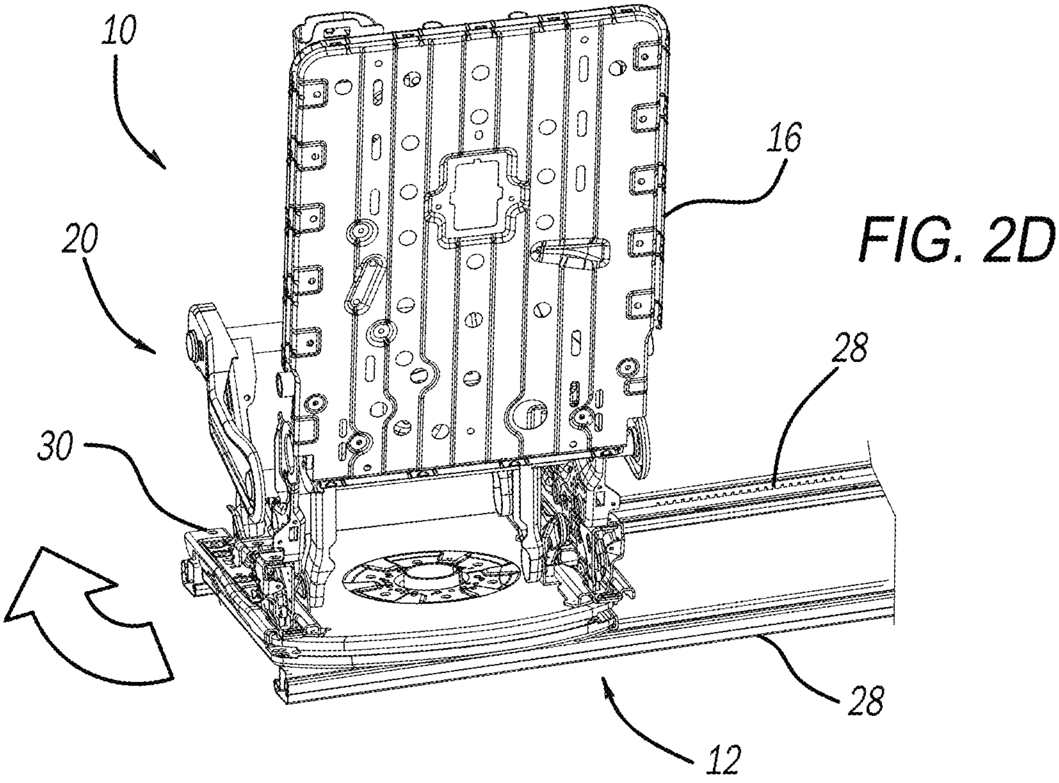
FIG. 2D is a view like FIG. 2A with the seat rotated in opposite direction.
Figure 2E:
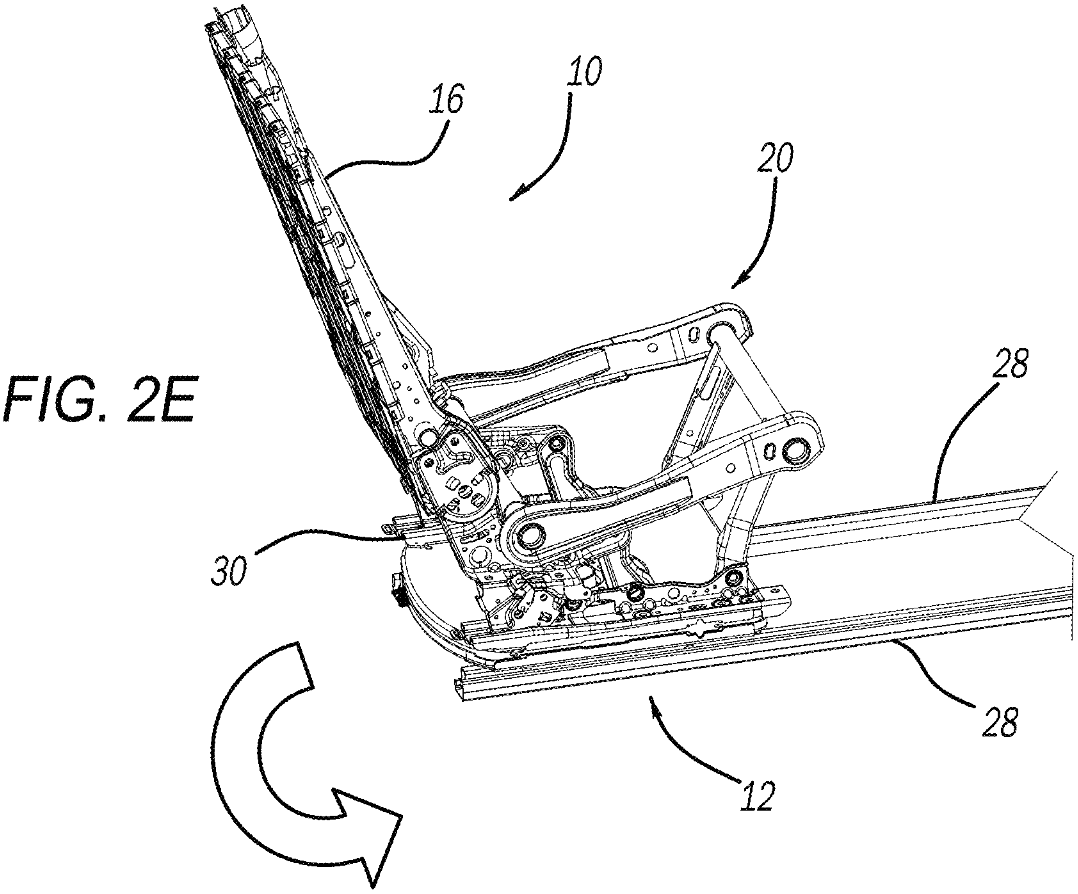
FIG. 2E is a view like FIG. 2A with the seat rotated 180°.

Example embodiments will now be described more fully with reference to the accompanying drawings.

Turning to the figures, a vehicle seat framework is illustrated and designated with the reference numeral 10. The seat framework 10 includes a swivel 12, a seat support 14, a seat back 16, a reclining mechanism 18 and a seat cushion frame 20.

The seat swivel 12 includes a base 22, a plate 24 and a rotation mechanism 26. The plate and base 24 and 22 are coupled with the rotation mechanism 26 such that the plate 24 rotates with respect to the base 22. The base 22 includes feet (not shown) to secure with rails 28. Thus, the swivel enables the seat 10 to go fore and aft on the rails 28 while also allowing the seat to rotate 90° to 180°, both ways, with respect to the base 22 as illustrated in FIG. 2.

The seat support 14 includes a base 30 to secure with the plate 24. Supports 32 extend from the base 30 to provide the height for the seat cushion. Also, the supports 32 include a cradle mechanism 34 that receives the seat cushion frame 20 in a sitting position. Also, the support includes linkage 36 that is pivotally connected with the base 30 and the seat cushion frame 20.

The seat back 16 and reclining mechanism 18 are like those available in the art. The seat mechanism 18 is connected with the seat back 16, reclining mechanism 18 and the seat support to recline the seat back 16 with respect to the seat support 14.

The seat cushion frame 20 includes a pair of links 38, 40 as well as a pair of shafts 42, 44. The links 38, 40 and shafts 42, 44 are coupled together to provide the seat cushion frame 20 with an overall rectangular configuration. The links 38, 40 oppose one another and are separated by the rails 42, 44. The rails 42, 44 are pivotal with respect to the links 38, 40. Thus, as the seat cushion frame 20 is moved from it first to second position, the links 38, 40 rotate along the rail 42, 44. The shafts 42, 44 are a right circular cylindrical design with the shaft 44 sitting in the cradle 34 in the seated position. The cradle has a U-shape receiver for receiving the cylindrical shaft 44. The link 36 includes a journal 46 that receives the shaft 42. The journal 46 is connected with the linkages 36 to enable the shaft 42 to rotate within the journal 46 as it moved from its first to second position.

Figure 3:
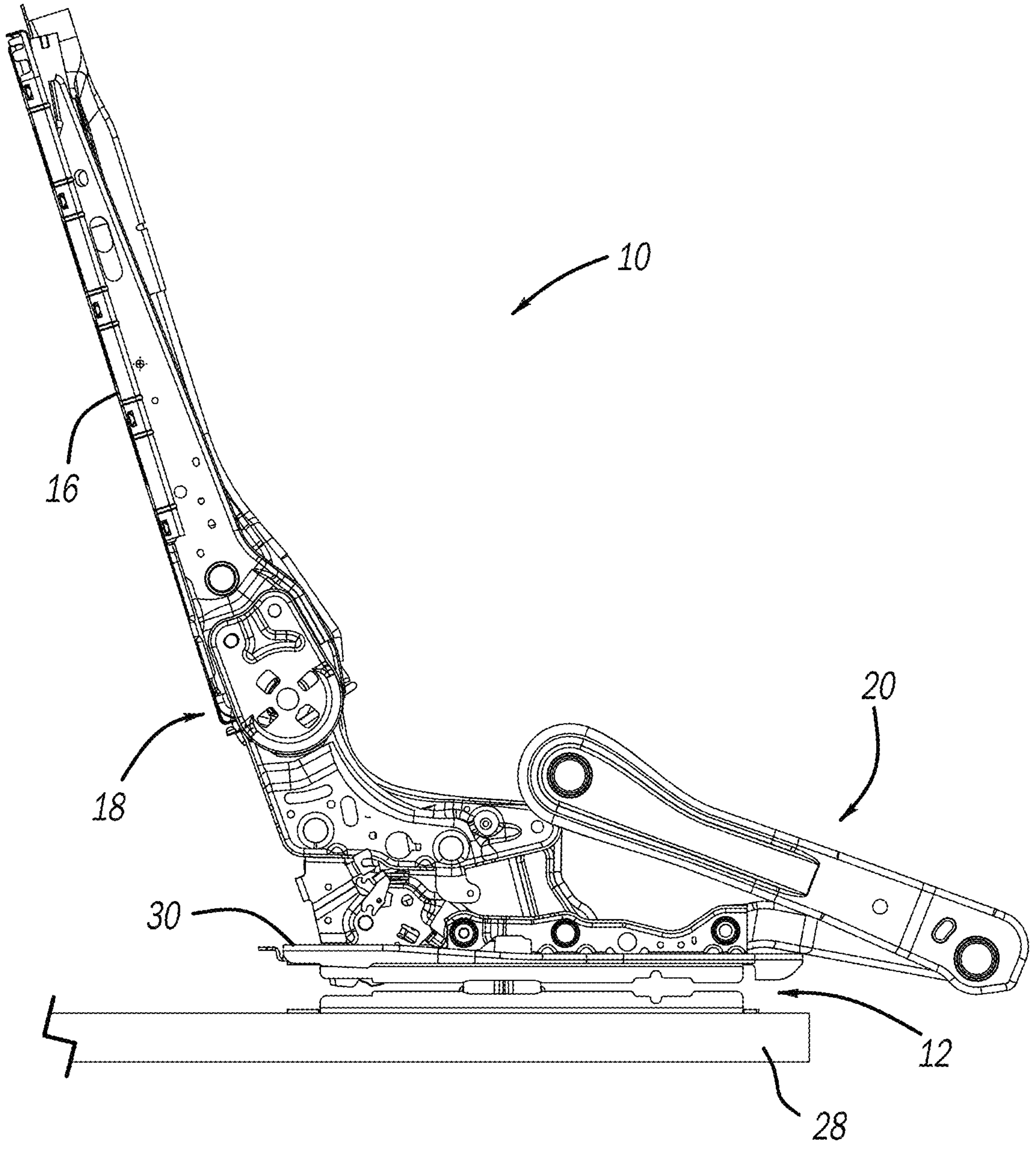
FIG. 3 is a perspective view of the seat in a nested position.
Figure 4:
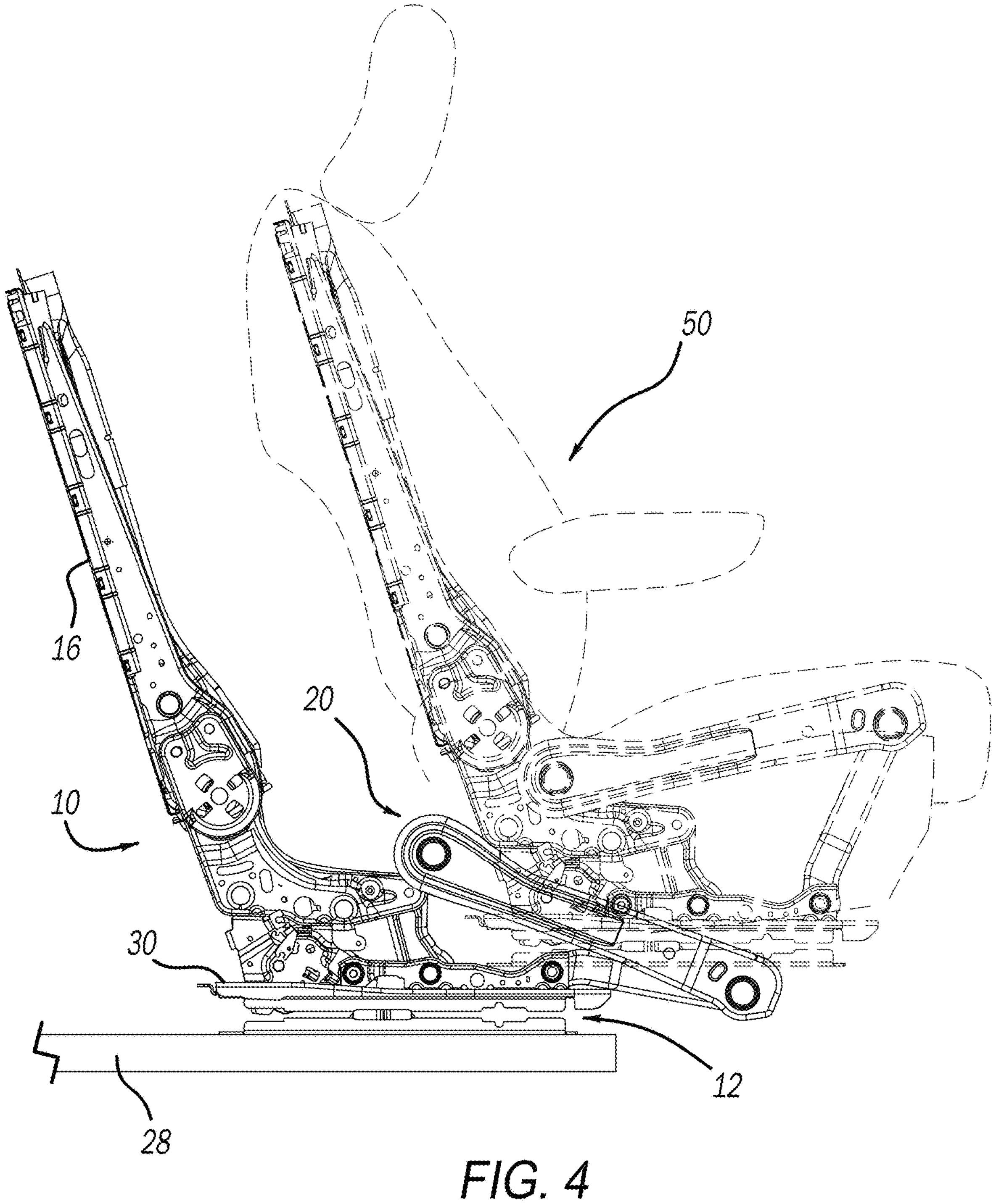
FIG. 4 is a side elevation view of the second row seat in a nested position.

As the shaft 44 is removed from the cradle 34, the seat cushion frame 20 is moved from a first to second position. As this occurs, the linkage 36 is pivoted with respect to the base 30. As this occurs, the seat cushion 20 is pushed forward of the seat 10 so that the shaft 42 rotates in the journal 46 as well as the shaft 44 rotates in the links 38, 40. This enables the seat cushion frame 20 to move fore of the seat into a stowage position as illustrated in FIG. 3. As can be seen in FIG. 4, the seat can be slid forward on the rails 28 so that the seat cushion frame 20 is positioned underneath the first row seat 50 out of the way for a storage position or a nested position to provide the vehicle with optimal cargo space.

The ability to stow the second-row seats of the vehicle behind and below the front row seats, leverages the sympathetic shape of the first and second row seat. Thus, the cushion of the second-row seat stows underneath the first-row seat cushion, with the back of the second-row seat nested directly behind the back of the first-row seat.

The second row seat is lowered to a stowed position that is less intrusive to rear and side sight lines for the vehicle passengers. The second row seats stows out of the way in a vehicle whose design precludes storing the seat in the floor, such as a vehicle with a high-voltage battery packaged in the floor.

The seat maintains the attachment of a child seat in the second row while allowing easy ingress to the third row. Or egress from the third row.

The seat shuttles the second row seat between the second row and the first row of the vehicle.

The seat swivels 90 degrees for easy ingress/egress, or 180 degrees to provide a rear-facing seated position that enables socialization/conviviality but meets regulatory requirements for a seated occupant position when the vehicle is moving. The following seating configurations are examples of what may be achieved due to the dual swiveling and stowing capability of the seat.

The front right seat folds and dives forward. The second row right seat swivels to face rearward and slides forward, all other seats in design position. This enables the rear facing occupant to face and converse with other passengers with ample leg room.

The second row left seat stows under the front left seat. The third row left seat stows in a tub behind the rear axle (typical of most MPVs). This enables the vehicle to carry long cargo or a large pet carrier with easy access from the second row while retaining capacity for 4 occupants.

The ability to collapse (narrow) the width of the seat by several inches to allow the previously described stowing action underneath and behind the first row seat, allows easy ingress to the third row when the seat is in the rear-facing position. This enables wide and long items to be stored in the center of the vehicle when the seat is in the forward-facing position.

The second row seat, in the rear-facing position enables use as a foot rest/ottoman for the third row occupants, and provide a mount for an entertainment screen to the third row occupants.

Another embodiment of this disclosure is in a 3-row passenger carrying vehicle that includes a pair of long tracks/rails running fore-aft in the floor of the vehicle, allowing the seat to move forward and backward.

The disclosure includes a first-row passenger side seat that is capable of collapsing and nesting underneath the dashboard or in a cavity obtained by removing the dashboard on the passenger side. This is done by folding the seat back down so it is parallel with the seat cushion, kneeling the seat structure forward, and sliding the entire seat forward on rails into the stored position. This enables the right side swiveling second row seat to move into the space previously occupied by the front row passenger seat. With the second row seat in the rear-facing position, an occupant may be seated facing rearward in a location close to the front row position, still allowing the driver to see the passenger side mirror.

1. This embodiment of the invention includes 3$^{rd}$ row seats that fold rearward into a tub behind the rear axle, as is common with current production MPVs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle seat comprising:

a seat swivel for engaging rails in a vehicle, the seat swivel slidable on the rails and the seat swivel enabling rotation of the vehicle seat;

a seat support coupled with the seat swivel;

a seat back coupled with the seat support;

a reclining mechanism coupled with both the seat back and seat support for pivoting of the seat back with respect to the seat support; and a seat cushion frame movably coupled with the seat support such that in a first position, the seat cushion frame is in a sitting position and in a second position, the seat cushion frame is in a non-sitting storage position.

2. The vehicle seat of claim 1, wherein the seat support includes at least one linkage pivotably coupled with the seat support and the seat cushion frame.

3. The vehicle seat of claim 1, wherein a pair of linkages are pivotally coupled with the seat support and seat cushion frame.

4. The vehicle seat of claim 1, wherein the seat support includes a cradle for securing the seat cushion frame in the first setting position.

5. The vehicle seat of claim 1, wherein the seat cushion frame includes a pair of links and a pair of shafts, the links pivoting with respect to the shafts and the links and shafts couple with one another forming a rectangular configuration.

6. The vehicle seat of claim 5, wherein one of the shafts is coupled with a seat support linkage for moving the seat cushion frame to the second position fore of the seat support.

7. The vehicle seat of claim 6, wherein the seat cushion frame is positionable under a first row seat.

8. A vehicle having a first row seat and a second row seat comprising:

rails in a floor of the vehicle, the second row seat receives in the rails;

the second row seat comprises a seat swivel for engaging rails in a vehicle, the seat swivel slidable on the rails and the seat swivel enabling rotation of the vehicle seat;

a seat support coupled with the seat swivel;

a seat back coupled with the seat support;

a reclining mechanism coupled with both the seat back and seat support for pivoting of the seat back with respect to the seat support; and a seat cushion frame movably coupled with the seat support such that in a first position, the seat cushion frame is in a sitting position and in a second position, the seat cushion frame is in a non-sitting storage position.

9. The vehicle of claim 8, wherein the seat support includes at least one linkage pivotably coupled with the seat support and the seat cushion frame.

10. The vehicle of claim 8, wherein a pair of linkages are pivotally coupled with the seat support and seat cushion frame.

11. The vehicle of claim 8, wherein the seat support includes a cradle for securing the seat cushion frame in the first setting position.

12. The vehicle of claim 8, wherein the seat cushion frame includes a pair of links and a pair of shafts, the links pivoting with respect to the shafts and the links and shafts couple with one another forming a rectangular configuration.

13. The vehicle of claim 12, wherein one of the shafts is coupled with a seat support linkage for moving the seat cushion frame to the second position fore of the seat support.

14. The vehicle of claim 13, wherein the seat cushion frame is positionable under a first row seat.

* * * * *